(12) United States Patent
Abhari et al.

(10) Patent No.: US 12,297,391 B2
(45) Date of Patent: May 13, 2025

(54) METHOD OF PROVIDING A BIO-OIL TO A HYDRODEOXYGENATION REACTOR

(71) Applicant: REG SYNTHETIC FUELS, LLC, Ames, IA (US)

(72) Inventors: Ramin Abhari, Bixby, OK (US); H. Lynn Tomlinson, Tulsa, OK (US); Nathan Jannasch, Broken Arrow, OK (US); Douglas Beshara, Tulsa, OK (US); Jesse Haney, III, Broken Arrow, OK (US); Cody Tidwell, Tulsa, OK (US)

(73) Assignee: REG Synthetic Fuels, LLC, Ames, IA (US)

( * ) Notice: Subject to any disclaimer, the term of this patent is extended or adjusted under 35 U.S.C. 154(b) by 0 days.

(21) Appl. No.: 18/660,870

(22) Filed: May 10, 2024

(65) Prior Publication Data

US 2025/0026984 A1    Jan. 23, 2025

Related U.S. Application Data

(63) Continuation of application No. 17/908,510, filed as application No. PCT/US2021/070214 on Mar. 2, 2021, now Pat. No. 12,018,214.

(Continued)

(51) Int. Cl.
*C10G 3/00* (2006.01)

(52) U.S. Cl.
CPC .............. *C10G 3/50* (2013.01); *C10G 3/42* (2013.01); *C10G 3/54* (2013.01);
(Continued)

(58) Field of Classification Search
CPC ... C10G 3/00; C10G 3/42; C10G 3/44; C10G 3/45; C10G 3/46; C10G 3/50; C10G 3/54; C10G 2300/1007; C10G 2300/1011; C10G 2300/802; C10G 2400/04; Y02P 30/20; Y02E 50/10
See application file for complete search history.

(56) References Cited

U.S. PATENT DOCUMENTS 9,328,303 B2    5/2016   Abhari et al.
9,523,041 B2   12/2016   Abhari et al.
(Continued)

FOREIGN PATENT DOCUMENTS

EP      1 741 768 A1      1/2007
JP      2008-545035 A    12/2008
WO   WO-2007/003709 A1   1/2007

OTHER PUBLICATIONS

European Search Report and Opinion on EP 21763806.3 Dtd Feb. 15, 2024, 9 pages.

(Continued)

*Primary Examiner* — In Suk C Bullock
*Assistant Examiner* — Jason Y Chong
(74) *Attorney, Agent, or Firm* — Foley & Lardner LLP

(57) ABSTRACT

A method is disclosed for hydrodeoxygenation of a bio-oil over a catalyst bed in a hydrodeoxygenation reactor, the method including combining a two-phase diluent having a water dew point and a bio-oil at a bio-oil temperature that is from 50° F. less than to 50° F. more than the water dew point. The two-phase diluent includes a liquid phase and a vapor phase, where the liquid phase includes a hydrocarbon and the vapor phase includes hydrogen and water.

19 Claims, 2 Drawing Sheets

Related U.S. Application Data

(60) Provisional application No. 62/984,260, filed on Mar. 2, 2020.

(52) U.S. Cl.
CPC ............... *C10G 2300/1007* (2013.01); *C10G 2300/1011* (2013.01); *C10G 2300/802* (2013.01); *C10G 2400/04* (2013.01)

(56) References Cited

U.S. PATENT DOCUMENTS

| | | |
|---|---|---|
| 2010/0056833 A1 | 3/2010 | Suarez et al. |
| 2012/0251424 A1 | 10/2012 | Havlik et al. |
| 2013/0219774 A1 | 8/2013 | Venderbosch et al. |
| 2013/0326936 A1 | 12/2013 | Ramirez-Corredores et al. |
| 2014/0261715 A1 | 9/2014 | Abhari et al. |
| 2016/0263537 A1 | 9/2016 | Kenreck et al. |
| 2017/0145318 A1 | 5/2017 | Myllyoja et al. |
| 2018/0127657 A1 | 5/2018 | Gong et al. |
| 2019/0211270 A2 | 7/2019 | Myllyoja et al. |

OTHER PUBLICATIONS

International Search Report and Written Opinion on PCT/US2021/070214 Dtd May 26, 2021, 14 pages.
Notice of Allowance on U.S. Appl. No. 17/908,510 Dtd Mar. 8, 2024, 11 pages.
Office Action and Search Report on CN 2021800259762 Dtd Apr. 29, 2024, 19 pages including English translation.
Office Action on CA 3,170,414 Dtd Sep. 29, 2023, 4 pages.
Written Opinion and Foreign Search Report on SG 11202252686N Dtd Mar. 27, 2024, 10 pages.
Notice of Reasons for Rejection on JP 2022-552522 DTD Jan. 23, 2025, 7 pages including English translation.

METHOD OF PROVIDING A BIO-OIL TO A HYDRODEOXYGENATION REACTOR

CROSS-REFERENCE TO RELATED APPLICATIONS

This application is a continuation of U.S. application Ser. No. 17/908,510, filed Aug. 31, 2022, which is a U.S. National Phase Application under 35 U.S.C. § 371 of International Application No. PCT/US2021/070214, filed on Mar. 2, 2021, which claims the benefit of and priority to U.S. Provisional Appl. No. 62/984,260, filed Mar. 2, 2020, the contents of each of which are incorporated by reference in their entirety for any and all purposes.

FIELD

The present technology relates to conversion of biorenewable feedstocks to hydrocarbons.

BACKGROUND

Renewable diesel (RD) is an isoparaffinic compression ignition fuel produced by hydroprocessing of fats and oils. The process comprises hydrodeoxygenation (HDO) of fatty acids/glycerides to hydrocarbons rich in n-paraffins. The HDO step may be followed by hydroisomerization (HI) of the n-paraffins to isoparaffins. Most HDO processes are conducted in adiabatic fixed-bed reactor systems comprising a sulfided base metal catalyst such as NiMo on γ-alumina support.

Since the HDO reaction is exothermic, a diluent is often used to mitigate the adiabatic temperature rise across the reactor and minimize undesirable side reactions. The diluent may be a petroleum-based or a bio-based hydrocarbon liquid. An example of a petroleum-based hydrocarbon diluent suitable for HDO is straight run diesel from crude oil distillation, while an example of a bio-based hydrocarbon is the product of fatty acid/glyceride HDO that is partially recycled to the reactor with fresh fatty acid/glyceride feed.

Commercial production of RD began in 2007 and has grown to over 1.5 billion gal/y worldwide today. In order to ensure feedstock availability, producers have been exploring use of lower quality bio-oil feedstock such as used cooking oils, trap greases, and palm sludge oil.

The greenhouse gas impact of any given fuel may be quantified by its Carbon Intensity (C.I.). C.I. is a measure of the life-cycle greenhouse gas emissions of a fuel relative to the energy obtained through its combustion. Depending on feedstock, RD has a C.I. value between 30 and 50 g $CO_2$e/MJ as estimated using the CA-GREET3.0 model provided by California Air Resources Board. The 30-50 g $CO_2$e/MJ C.I. range compares to 70-80 g $CO_2$e/MJ for bioethanol and 100+$CO_2$e/MJ for petroleum diesel. Generally, the best/lowest C.I. values are provided by the lower quality bio-oil feedstock. For example, RD produced by used cooking oil has a C.I. of 30 g $CO_2$e/MJ or less.

These lower quality bio-oils have a number of contaminants that negatively impact HDO performance. For example, the rate of reactor fouling (including fouling of reactor internals and catalyst) is increased with more contaminated feeds. The prior art discloses that iron contaminants can cause accelerated plugging. Phosphorous and metals other than iron have also been cited in prior art literature as causing reactor fouling issues and catalyst deactivation. Fouling may also be caused by polymerization of the reactive components in bio-oil. Such reactive components include free fatty acids, polyunsaturated fatty acids, and oxidation byproducts of fatty acids.

There is thus a need for method to mitigate fouling in bio-oil HDO reactors such that lower quality bio-oil feedstock is efficiently converted into low carbon intensity fuels.

SUMMARY

Water is a byproduct of HDO reactions. Depending on the oxygen content of the bio-oil, the water byproduct is typically between 5% and 20% of the total liquid product mass. Although most water can be removed from the hydrogen and hydrocarbon recycle streams by conventional separation methods such as vapor-liquid and liquid-liquid separation, some water remains in these process streams that are combined with fresh bio-oil feed to the reactor.

These hydrogen and hydrocarbon streams comprising water vapor are characterized by a water dew point. Water dew point, in general, is the temperature at which water droplets form in a vapor stream (or in the vapor fraction of a two-phase stream wherein the liquid fraction is a hydrocarbon). Water dew point is generally a function involving the concentration of water in the vapor phase; the higher the water concentration, the higher the water dew point.

It has surprisingly been observed that when a bio-oil is introduced into a diluent comprising a hydrocarbon liquid and water vapor, the difference between the diluent's water dew point and the bio-oil temperature can impact the rate of reactor fouling. Specifically, when the water dew point is higher than the temperature of the bio-oil feed by more than 50° F., accelerated reactor fouling is observed.

Without being bound to theory, it is believed by the inventors that fouling is accelerated by formation of water droplets around which foulant particles that are formed at high temperature can coalesce and agglomerate. Due to the mixing dynamics that occur when the diluent and bio-oil are brought together, such water droplets may form and cause fouling of the reactor internals and catalyst bed. The water dew point of the diluent and the temperature of the bio-oil when it comes in contact therewith has thus shown to be a predictor of this phenomenon and one basis for a method of the present technology for mitigating fouling when processing low-value/waste fats and oils.

Thus, in an aspect, a method for hydrodeoxygenation of a bio-oil over a catalyst bed in an HDO reactor is provided where the method includes combining (i) a two-phase diluent having a water dew point and (ii) a bio-oil at a bio-oil temperature that is from about 50° F. less than to about 100° F. more than the water dew point. In the method, the two-phase diluent includes a liquid phase and a vapor phase. The liquid phase includes a hydrocarbon and the vapor phase includes hydrogen and water. Therefore, in any embodiment herein of the process, the bio-oil temperature may be about 50° F. less than the water dew point, about 45° F. less than the water dew point, about 40° F. less than the water dew point, about 35° F. less than the water dew point, about 30° F. less than the water dew point, about 25° F. less than the water dew point, about 20° F. less than, the water dew point about 15° F. less than the water dew point, about 10° F. less than the water dew point, about 5° F. less than the water dew point, the same as (i.e., 0° F. from) the water dew point, about 5° F. more than the water dew point, about 10° F. more than the water dew point, about 15° F. more than the water dew point, about 20° F. more than the water dew point, about 25° F. more than the water dew point, about 30° F. more than the water dew point, about 35° F. more than the water dew point, about 40° F. more than the water dew point, about 45° F. more than the water dew point, about 50° F. more than the water dew point, about 55° F. more than the water dew point, about 60° F. more than the water dew point, about 65° F. more than the water dew point, about 70° F. more than the water dew point, about 75° F. more than the water dew point, about 80° F. more than the water dew point, about 85° F. more than the water dew point, about 90° F. more than the water dew point, about 95° F. more than the water dew point, about 100° F. more than the water dew point, or any range including and/or in between any two of these values. In any embodiment of the method, it may be that the bio-oil temperature is from 20° F. to 0° F. less than the water dew point. In any embodiment of the method, it may be that the bio-oil temperature is from 10° F. to 0° F. less than the water dew point. In any embodiment of the method, it may be that the bio-oil temperature from 0° F. to 20° F. more than the water dew point of the two-phase diluent.

In any embodiment of the method, it may be that method comprises combining the bio-oil and the two-phase diluent in a mix-tee. In any embodiment of the method, it may be that the method comprises combining the bio-oil and the two-phase diluent through a static-mixer. In any embodiment of the method, it may be that combining the bio-oil and the two-phase diluent comprises directing the bio-oil through a quill within a pipe, wherein the pipe provides the two-phase diluent. In any embodiment of the method, it may be that the bio-oil comprises poultry fats, poultry oil, vegetable fats, rendered fats, rendered oils, restaurant grease, brown grease, yellow grease, used cooking oil, waste industrial frying oils, fish oils, fish fats, algal oils, microbial oils, or a combination of any two or more thereof. In any embodiment of the method, it may be that the method produces a renewable diesel, wherein the renewable diesel has a carbon intensity of 30 gCO$_2$e/MJ or less according to California Air Resource Board CA-GREET3.0 model. In any embodiment of the method, it may be that fouling of the HDO reactor as evidenced by a pressure drop increase of no more than 10 psi during the service life of the catalyst. In any embodiment of the method, it may be that combining the two-phase diluent and the bio-oil provides a diluted bio-oil, and wherein the process further comprises contacting the diluted bio-oil with the catalyst bed to provide a catalyst bed outlet product. In any embodiment of the method, it may be that prior to combining the two-phase diluent and the bio-oil, the method comprises adjusting the bio-oil temperature to be from 50° F. less than to 50° F. more than the water dew point. In any embodiment of the method, it may be that prior to combining the two-phase diluent and the bio-oil, the process comprises measuring the two-phase diluent to determine the water dew point.

DETAILED DESCRIPTION

Figure 1:
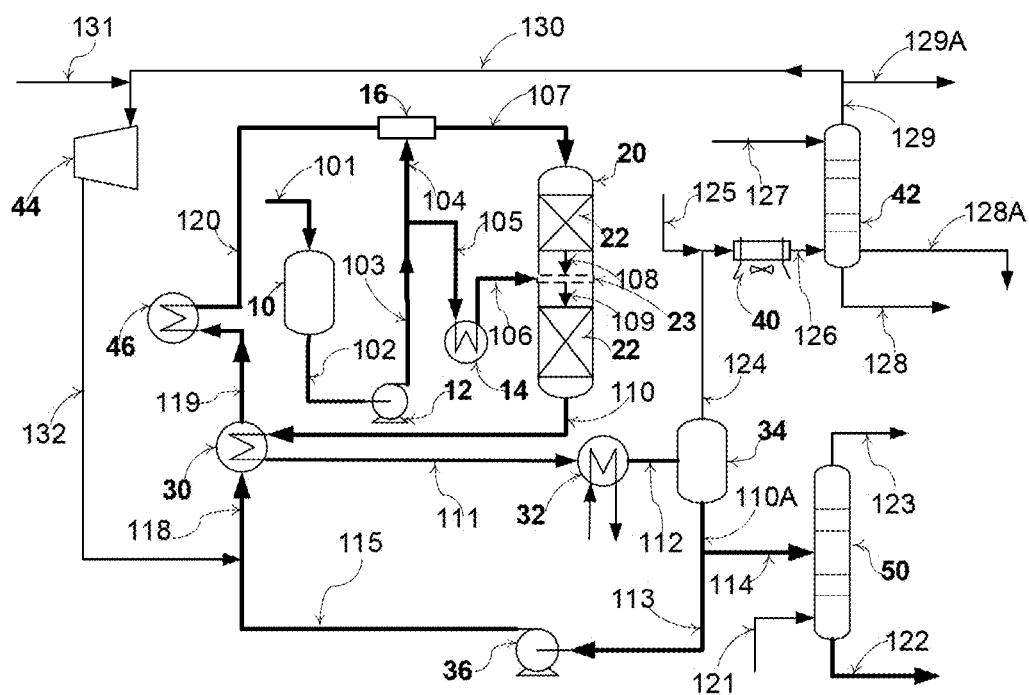
FIG. 1 provides a schematic diagram of an operation for producing renewable diesel according to an embodiment of the present technology.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

The following terms are used throughout as defined below.

As used herein and in the appended claims, singular articles such as "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term—for example, "about 10 weight %" would be understood to mean "9 weight % to 11 weight %." It is to be understood that when "about" precedes a term, the term is to be construed as disclosing "about" the term as well as the term without modification by "about"—for example, "about 10 wt. %" discloses "9 wt. % to 11 wt. %" as well as disclosing "10 wt. %."

The phrase "and/or" as used in the present disclosure will be understood to mean any one of the recited members individually or a combination of any two or more thereof—for example, "A, B, and/or C" would mean "A, B, C, A and B, A and C, or B and C."

As used herein, "alkyl" groups include straight chain and branched alkyl groups. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, sec-butyl, t-butyl, neopentyl, and isopentyl groups. It will be understood that the phrase "$C_x$-$C_y$ alkyl," such as $C_1$-$C_4$ alkyl, means an alkyl group with a carbon number falling in the range from x to y.

"Oxygenates" as used herein means carbon-containing compounds containing at least one covalent bond to oxygen. Examples of functional groups encompassed by the term include, but are not limited to, carboxylic acids, carboxylates, acid anhydrides, aldehydes, esters, ethers, ketones, and alcohols, as well as heteroatom esters and anhydrides such as phosphate esters and phosphate anhydrides. Oxygenates may also be oxygen containing variants of aromatics, cycloparaffins, and paraffins as described herein.

The term "paraffins" as used herein means non-cyclic, branched or unbranched alkanes. An unbranched paraffin is an n-paraffin; a branched paraffin is an iso-paraffin. "Cycloparaffins" are cyclic, branched or unbranched alkanes.

The term "paraffinic" as used herein means both paraffins and cycloparaffins as defined above as well as predominantly hydrocarbon chains possessing regions that are alkane, either branched or unbranched, with mono- or di-unsaturation (i.e., one or two double bonds).

Hydroprocessing as used herein describes the various types of catalytic reactions that occur in the presence of hydrogen without limitation. Examples of the most common hydroprocessing reactions include, but are not limited to, hydrogenation, hydrodesulfurization (HDS), hydrodenitrogenation (HDN), hydrotreating (HT), hydrocracking (HC), aromatic saturation or hydrodearomatization (HDA), hydrodeoxygenation (HDO), decarboxylation (DCO), hydroisomerization (HI), hydrodewaxing (HDW), hydrodemetallization (HDM), decarbonylation, methanation, and reforming. Depending upon the type of catalyst, reactor configuration, reactor conditions, and feedstock composition, multiple reactions can take place that range from purely thermal (i.e., do not require catalyst) to catalytic. In the case of describing the main function of a particular hydroprocessing unit, for example an HDO reaction system, it is understood that the HDO reaction is merely one of the predominant reactions that are taking place and that other reactions may also take place.

Decarboxylation (DCO) is understood to mean hydroprocessing of an organic molecule such that a carboxyl group is removed from the organic molecule to produce $CO_2$, as well as decarbonylation which results in the formation of CO.

Pyrolysis is understood to mean thermochemical decomposition of carbonaceous material with little to no diatomic oxygen or diatomic hydrogen present during the thermochemical reaction. The optional use of a catalyst in pyrolysis is typically referred to as catalytic cracking, which is encompassed by the term as pyrolysis, and is not be confused with hydrocracking.

Hydrotreating (HT) involves the removal of elements from groups 3, 5, 6, and/or 7 of the Periodic Table from organic compounds. Hydrotreating may also include hydrodemetallization (HDM) reactions. Hydrotreating thus involves removal of heteroatoms such as oxygen, nitrogen, sulfur, and combinations of any two more thereof through hydroprocessing. For example, hydrodeoxygenation (HDO) is understood to mean removal of oxygen by a catalytic hydroprocessing reaction to produce water as a by-product; similarly, hydrodesulfurization (HDS) and hydrodenitrogenation (HDN) describe the respective removal of the indicated elements through hydroprocessing.

Hydrogenation involves the addition of hydrogen to an organic molecule without breaking the molecule into subunits. Addition of hydrogen to a carbon-carbon or carbon-oxygen double bond to produce single bonds are two non-limiting examples of hydrogenation. Partial hydrogenation and selective hydrogenation are terms used to refer to hydrogenation reactions that result in partial saturation of an unsaturated feedstock. For example, vegetable oils with a high percentage of polyunsaturated fatty acids (e.g., linoleic acid) may undergo partial hydrogenation to provide a hydroprocessed product wherein the polyunsaturated fatty acids are converted to mono-unsaturated fatty acids (e.g., oleic acid) without increasing the percentage of undesired saturated fatty acids (e.g., stearic acid). While hydrogenation is distinct from hydrotreatment, hydroisomerization, and hydrocracking, hydrogenation may occur amidst these other reactions.

Hydrocracking (HC) is understood to mean the breaking of a molecule's carbon-carbon bond to form at least two molecules in the presence of hydrogen. Such reactions typically undergo subsequent hydrogenation of the resulting double bond.

Hydroisomerization (HI) is defined as the skeletal rearrangement of carbon-carbon bonds in the presence of hydrogen to form an isomer. Hydrocracking is a competing reaction for most HI catalytic reactions and it is understood that the HC reaction pathway, as a minor reaction, is included in the use of the term HI. Hydrodewaxing (HDW) is a specific form of hydrocracking and hydroisomerization designed to improve the low temperature characteristics of a hydrocarbon fluid.

It will be understood that if a composition is stated to include "$C_x$-$C_y$ hydrocarbons," such as $C_7$-$C_{12}$ n-paraffins, this means the composition includes one or more paraffins with a carbon number falling in the range from x to y.

A "diesel fuel" in general refers to a fuel with boiling point that falls in the range from about 150° C. to about 360° C. (the "diesel boiling range").

A "petroleum diesel" as used herein refers to diesel fuel produced from crude oil, such as in a crude oil refining facility and includes hydrotreated straight-run diesel, hydrotreated fluidized catalytic cracker light cycle oil, hydrotreated coker light gasoil, hydrocracked FCC heavy cycle oil, and combinations thereof. A "petroleum-based hydrocarbon liquid" or "petroleum-based hydrocarbon diluent" as used herein refers to hydrocarbons produced from crude oil, such as in a crude oil refining facility and includes hydrotreated straight-run diesel, hydrotreated fluidized catalytic cracker light cycle oil, hydrotreated coker light gasoil, hydrocracked FCC heavy cycle oil, and combinations thereof.

It is to be understood that a "volume percent" or "vol. %" of a component in a composition or a volume ratio of different components in a composition is determined at 60° F. based on the initial volume of each individual component, not the final volume of combined components.

THE PRESENT TECHNOLOGY

The present technology relates to a method of producing renewable diesel from a bio-oil feedstock comprising low-value and waste fats, oil, and greases (FOG). The method comprises hydrodeoxygenation of the bio-oil in at least one fixed-bed reactor. The bio-oil is combined with a heated diluent characterized by a water dew point. In the present technology, the bio-oil temperature is maintained at a temperature no greater than 50° F. cooler than the water dew point of the diluent. The method of this disclosure reduces the rate of fouling in the fixed-bed reactor.

Referring to the non-limiting embodiment depicted in FIG. 1, a bio-oil 101 is transferred to a charge pump surge drum 10. The bio-oil comprises low-value/waste FOG including animal fats and vegetable selected from the group comprising poultry fats, poultry oil, vegetable fats, rendered fats, rendered oils, restaurant grease, brown grease, yellow grease, used cooking oil, waste industrial frying oils, fish oils, fish fats, algal oils, microbial oils, or a combination of any two or more thereof. The bio-oil 101 may or may not comprise (i) oils extracted or pressed from the seeds of energy crops such as *carinata*, jatropha, and castor seeds, (ii) plant oils recovered as byproducts of edible oil production operations such as palm sludge oil, or (iii) a combination of any one or more embodiment of (i) and/or (ii). The bio-oil 101 may include oils derived from chemical or thermal liquefaction of cellulosic biomass. Fast pyrolysis is an example of a thermal liquefaction process and the bio-oil product thereof is sometimes referred to as pyrolysis oil. Even after pretreatment, bio-oils may contain up to 10 ppm phosphorus and up to 10 ppm total metals (including iron, calcium, magnesium, sodium, and potassium).

Regardless of the source and contaminants, the bio-oil 101 typically has an elemental oxygen content from about 5 wt % to about 20 wt %, where the "elemental oxygen content" of a bio-oil is in reference to oxygen atoms in fatty acids and other biological compound, not e.g., water. In any embodiment disclosed herein, the bio-oil 101 may have an elemental oxygen content from about 8 wt % to about 16 wt % of the bio-oil.

The bio-oil 101 may include between 5 and 80 wt % free fatty acids (FFA). Additionally, the bio-oil 101 may have a water content of 0.1 to 1.0 wt % as measured by Karl Fisher titration. The water in the bio-oil may be present as dissolved water, free water, and/or emulsified water.

The surge drum liquid 102 is pressurized to a reactor inlet pressure via pump 12 to provide a pressurized bio-oil 103. The pressurized bio-oil 103 is split into two streams—bio-oil split stream 104 and bio-oil split stream 105. Bio-oil split stream 104 is combined with a heated diluent 120 in an inline mixing device 16 to provide a first diluted bio-oil 107.

The heated diluent 120 may include at least some of the hydrogen required for the HDO reaction. As such, the heated diluent 120 may be a two phase fluid comprising hydrocarbon liquid and a hydrogen-rich gas. In any embodiment herein, it may be heated diluent 120 is a single-phase liquid wherein hydrogen is dissolved in the hydrocarbon liquid. In any embodiment disclosed herein, it may be the heated diluent 120 has a water content between about 0.5 and 4.0 wt %. Regardless of the embodiment, the heated diluent 120 has a water dew point between 210° F. and 350° F. The process involves maintaining a difference between (a) the water dew point of the heated diluent 120, and (b) the temperature of the bio-oil split stream 104, such that the temperature of the bio-oil split stream is from 50° F. less than the water dew point to 100° F. higher than the water dew point. For example, if the water dew point of the heated diluent 120 is 300° F., the temperature of the bio-oil split stream 104 is maintained at no cooler than 250° F. In any embodiment disclosed herein, it may be the bio-oil is no more than 40° F. cooler than the diluent 120 water dew point temperature. In any embodiment disclosed herein, it may be the bio-oil is no more than 30° F. cooler than the diluent 120 water dew point temperature. In any embodiment disclosed herein, it may be the bio-oil is no more than 20° F. cooler than the diluent 120 water dew point In any embodiment disclosed herein, it may be the bio-oil is between 10° F. and 50° F. cooler than the diluent 120 water dew point. In any embodiment disclosed herein, it may be the bio-oil temperature is the same or higher than the diluent 120 water dew point. As such, the water droplet formation and consequent reactor fouling issues are mitigated.

Inline mixing device 16 may be a mix-tee, a static mixer, a pipe with an injection quill (e.g. where split stream 104 enters through a quill into a pipe for mixing with the heated diluent 120), or other similar device known to a person of ordinary skill in the art.

The first diluted bio-oil 107 enters HDO reactor 20. The reactor 20 includes at least one bed of catalyst 22. Notably, in the present technology, when the reactor contains only one bed of catalyst, the pressurized bio-oil feed is not split.

The bed of catalyst 22 includes a sulfided base metal catalyst supported on γ-alumina. The sulfided base metal catalyst comprises Ni, Mo, Co, W, or a combination of any two or more thereof.

The HDO reactor 20 is operated at a Weighted Average Bed Temperature (WABT) between 550° F. and 700° F. WABT is given by Eq. 1 below where $T_{in}$ and $T_{out}$ respectively refer to temperatures at the inlet and outlet of the catalyst bed.

$$WABT = T_{in} + 2/3(T_{out} - T_{in}) \quad (1)$$

The HDO reactor 20 may operate under a hydrogen partial pressure between 600 and 2,200 psi, preferably between 1,000 and 1,800 psi. The hydrogen may be supplied via the heated diluent 120 and/or directly to the reactor (not shown). An example of the latter is quench hydrogen introduced between the catalyst beds. In any embodiment disclosed herein, the hydrogen may be supplied to the reactor at a gas-to-oil ratio between 5,000 SCFB and 20,000 SCFB (wherein the ratio refers to standard cubic feet of $H_2$ to barrels of bio-oil). The bio-oil 101 is processed through the reactor at a liquid hourly space velocity between 0.2 and 10.0 $h^{-1}$ (vol/h of bio-oil per vol of catalyst). At these conditions, the bio-oil split stream 104 is at least mostly converted to a catalyst bed outlet product 108.

The catalyst bed outlet product 108 comprises hydrogen gas and the liquid product of bio-oil HDO conversion. As such, the catalyst bed outlet product 108 is a two phase fluid comprising hydrocarbon liquid and a hydrogen-rich gas. In any embodiment disclosed herein, it may be the catalyst bed outlet product 108 has a water content between 2.0 and 6.0 wt %. Regardless of the embodiment, the heated diluent 120 has a water dew point between 240° F. and 350° F.

The bio-oil split stream 105 is heated through a heat exchanger 14 to provide a heated bio-oil 106. The heat exchanger 14 is preferably a shell and tube exchanger with steam condensation on the shell side. In any embodiment herein, the heat exchanger 14 may include a heater with superheated water providing the heat. In any embodiment herein, the heat exchanger 14 may include a heater with a heat transfer fluid providing the heat.

The heated bio-oil 106 is combined with the catalyst bed outlet product 108 in a reactor internal mixing device 23 to form a second diluted bio-oil 109. The mixing device 23 may be a mixing box, a distributor tray, or any other reactor internal apparatus suitable for mixing two different streams together as understood by a person of ordinary skill in that art.

Regardless of the mixing device 23, the temperature of the heated bio-oil 106 is from about 50° F. less than to about 100° F. greater than the water dew point of the catalyst bed outlet product 108. For example, if the water dew point of the catalyst bed outlet product 108 is 350° F., the temperature of the heated bio-oil 106 is maintained at no cooler than 300° F. In any embodiment disclosed herein, it may be the heated bio-oil 106 is no more than 40° F. cooler than the catalyst bed outlet product 108 water dew point temperature. In any embodiment disclosed herein, it may be the heated bio-oil 106 is no more than 30° F. cooler than the catalyst bed outlet product 108 water dew point. In any embodiment disclosed herein, it may be the heated bio-oil 106 is no more than 20° F. cooler than the catalyst bed outlet product 108 water dew point. In any embodiment disclosed herein, it may be the heated bio-oil 106 is between 10° F. and 50° F.

cooler than the catalyst bed outlet product 108 water dew point. In any embodiment herein, the heated bio-oil 106 may be heated to a temperature that is the same or higher than the water dew point of the catalyst bed outlet product 108, diluting the heated bio-oil 106. As such, water droplet formation and consequent reactor fouling issues are mitigated (e.g., by reducing the rate of deposit formation and accumulation on bed of catalyst 22). In any embodiment herein, the overall pressure-drop increase due to fouling across the bed of catalyst 22 may be less than 10 psi over the service life of the catalyst.

The reactor effluent 110 is cooled through a feed-effluent exchanger 30 to provide a partially cooled effluent 111 before being cooled in a cooler 32 to provide a cooled effluent 112. The cooled effluent 112 is at a temperature between 300° F. and 400° F. such that the water byproduct of HDO is mostly in the vapor phase. The cooled effluent 112 is separated into a HPS liquid stream 110A and a vapor stream 124 in a high pressure separator (HPS) 34. The HPS liquid stream 110A comprises the liquid product of HDO conversion, mainly hydrocarbons in the C10-C24 range. The HPS liquid stream 110A is partially recycled as a recycle stream 113 through recycle pump 36 to provide a pressurized recycle stream 115. The pressurized recycle stream 115 is combined with hydrogen 132 to provide a hydrogen-containing diluent stream 118. The hydrogen-containing diluent stream 118 is heated through the aforementioned feed-effluent exchanger 30 to provide a partially heated hydrogen-containing diluent stream 119. This stream is subsequently heated in a diluent heater 46 to provide the heated diluent 120 described earlier herein. The diluent heater 46 is preferably a shell and tube exchanger with hot oil circulation or a fired heater.

Returning to the HPS 34, the HPS separator vapor 124 is contacted with a wash water stream 125 before cooling and condensation in an air cooler 40. The cooled and partially condensed stream 126 exits the air cooler 40 at a temperature between 80° F. and 180° F. The cooled and partially condensed stream 126 is directed to a separation and gas treatment vessel 42 where a liquid effluent 128 comprising water is separated from a hydrogen-rich gas stream 129. In order to enhance removal of the gas phase byproducts of HDO such as hydrogen sulfide and carbon dioxide, an absorption liquid 127 may be introduced to the separation and gas treatment vessel 42. The absorption liquid 127 may be water or any aqueous solutions comprising sodium hydroxide or amine compounds. In any embodiment disclosed herein, the hydrocarbon stream 128A may be drawn from a separation and gas treatment vessel 42 and further processed to obtain hydrocarbon products. The gas product from the separation and gas treatment vessel 42 is mostly recycled as a recycle hydrogen-rich gas 130 while maintaining a purge/bleed 129A. The recycle hydrogen-rich gas 130 is combined with a makeup hydrogen 131 and directed to a hydrogen compressor 44 for providing hydrogen to the HDO reactor system described herein.

Returning to the HPS 34, a portion of the HPS liquid stream 110A is directed to a stripper 50 as liquid product 114. The flow rate of HPS liquid 110A recycled as bio-oil diluent (Stream 113) relative to liquid product stripped (Stream 114) is between 2:1 and 5:1, preferably between 2.5:1 and 4:1. The stripper 50 utilizes a stripping gas 121 to remove any dissolved byproducts of the HDO reaction—e.g., hydrogen sulfide, ammonia, and water—from the paraffinic diesel product 122. The stripped components plus stripping gas 121 are shown leaving the stripper 50 as stream 123. The paraffinic diesel product 122 is a $C_{10}$-$C_{24}$ hydrocarbon product with 0.5 to 3.0 wt % $C_{24+}$ hydrocarbons and a cloud point in the 18-22° C. range. In embodiments, the paraffinic diesel product 122 is subjected to hydrocracking/isomerization as taught in the prior art to reduce the cloud point of the diesel to a value below 0° C., preferably in the range of −30° C. to −8° C.

The renewable diesel product produced according to the present technology may have a carbon intensity less than 50 gCO2e/MJ, preferably less than 40 gCO2e/MJ, and most preferably less than 30 gCO2e/MJ. The renewable diesel process thus disclosed achieves production of such advantageous fuels while maintaining overall pressure-drop increase due to fouling across catalyst beds at less than 10 psi over the service life of the catalyst.

The present technology, thus generally described, will be understood more readily by reference to the following examples, which are provided by way of illustration and are not intended to be limiting of the present technology.

EXAMPLES

Example 1

Two commercial scale HDO reactors with same catalyst loading and operating under the same conditions with the same bio-oil feedstock were found to foul at different rates as evidenced by rate of pressure drop increase. The water dew point of the diluent to the first reactor (diluted bio-oil) was estimated via Hysys process simulation software using Peng Robinson VLE thermodynamic model and found to be 215° F. Using the same methodology, the feed to the second reactor was found to have a water dew point of 348° F. The diluent to each reactor was combined with the same temperature bio-oil (~165° F.) directly upstream of the respective reactor. The first reactor with a smaller difference between bio-oil temperature and diluent water dew point temperature did not show any signs of pressure-drop increase during service life. The second reactor with a larger difference between bio-oil temperature and diluent water dew point exhibited pressure-drop increase during the same period and had to be shut down.

Example 2

Figure 2:
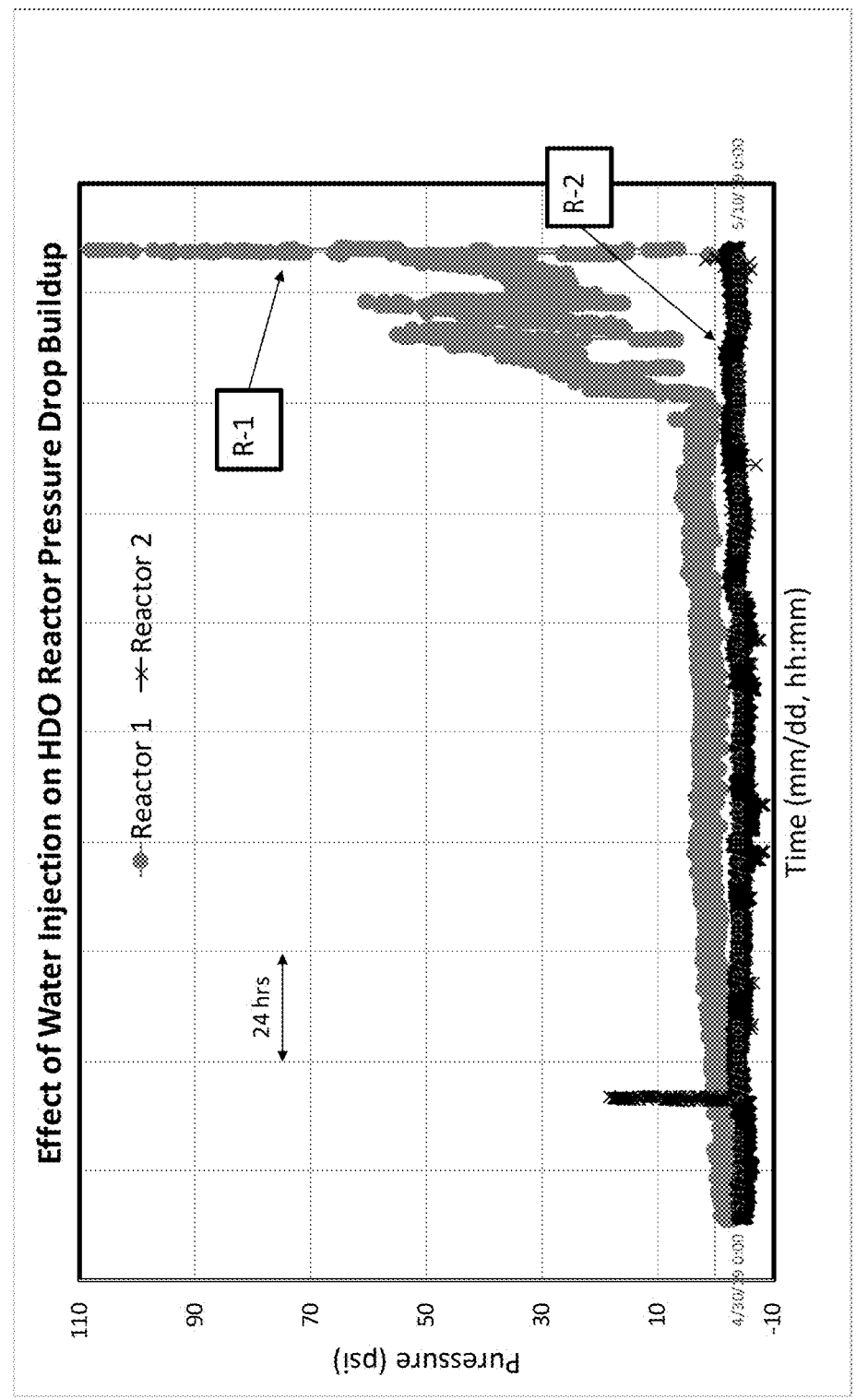
FIG. 2 provides a graph of data from studies according to the working examples, involving two pilot plant HDO reactors (R1 and R2) of the same makeup and catalyst composition, and run under the same conditions with the same feed with the exception that the feed of R1 was spiked with 3% water while no water was added to the feed of R2.

Two identical pilot plant HDO reactors were loaded with the same catalyst. No pressure drop was observed across either reactor after a few weeks of operation with a refined, bleached, and deodorized soybean oil feedstock containing 11% technical grade oleic acid (as free fatty acid), diluted with an isoparaffinic hydrocarbon in the diesel boiling range. Both reactors were then switched to run on the same blend of low-value fats, oils, and grease comprising used cooking oil and palm sludge oil, diluted in the same isoparaffinic hydrocarbon diluent. Reactor 1 (R1) was spiked with 3% water whereas Reactor 2 (R2) was used as control (no added water). As shown in FIG. 2, after about 7.5 days, rapid pressure-drop increase was observed in R1 while R2 pressure-drop remained essentially unchanged. The reactors were subsequently opened and inspected. Significantly higher fouling/deposit was observed in R1 than R2.

While certain embodiments have been illustrated and described, a person with ordinary skill in the art, after reading the foregoing specification, can effect changes, substitutions of equivalents and other types of alterations to the compounds of the present technology or salts, pharmaceutical compositions, derivatives, prodrugs, metabolites, tautomers or racemic mixtures thereof as set forth herein.

Each aspect and embodiment described above can also have included or incorporated therewith such variations or aspects as disclosed in regard to any or all of the other aspects and embodiments.

The present technology is also not to be limited in terms of the particular aspects described herein, which are intended as single illustrations of individual aspects of the present technology. Many modifications and variations of this present technology can be made without departing from its spirit and scope, as will be apparent to those skilled in the art. Functionally equivalent methods within the scope of the present technology, in addition to those enumerated herein, will be apparent to those skilled in the art from the foregoing descriptions. Such modifications and variations are intended to fall within the scope of the appended claims. It is to be understood that this present technology is not limited to particular methods, reagents, compounds, compositions, labeled compounds or biological systems, which can, of course, vary. It is also to be understood that the terminology used herein is for the purpose of describing particular aspects only, and is not intended to be limiting. Thus, it is intended that the specification be considered as exemplary only with the breadth, scope and spirit of the present technology indicated only by the appended claims, definitions therein and any equivalents thereof.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

In addition, where features or aspects of the disclosure are described in terms of Markush groups, those skilled in the art will recognize that the disclosure is also thereby described in terms of any individual member or subgroup of members of the Markush group. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents (for example, journals, articles, and textbooks) referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The present technology may include, but is not limited to, the features and combinations of features recited in the following lettered paragraphs, it being understood that the following paragraphs should not be interpreted as limiting the scope of the claims as appended hereto or mandating that all such features must necessarily be included in such claims:

A. A method for hydrodeoxygenation of a bio-oil over a catalyst bed in a hydrodeoxygenation reactor ("HDO reactor"), the method comprising combining a two-phase diluent having a water dew point and a bio-oil at a bio-oil temperature that is from 50° F. less than to 100° F. more than the water dew point;
wherein the two-phase diluent comprises a liquid phase and a vapor phase, the liquid phase comprising a hydrocarbon and the vapor phase comprising hydrogen and water.

B. The method of Paragraph A, wherein the bio-oil temperature is from 20° F. to 0° F. less than the water dew point.

C. The method of Paragraph A or Paragraph B, wherein the bio-oil temperature is from 10° F. to 0° F. less than the water dew point.

D. The method of Paragraph A, wherein the bio-oil temperature from 0° F. to 20° F. more than the water dew point of the two-phase diluent.

E. The method of any one of Paragraphs A-D, the method comprising combining the bio-oil and the two-phase diluent in a mix-tee.

F. The method of any one of Paragraphs A-E, the method comprising combining the bio-oil and the two-phase diluent through a static-mixer.

G. The method of any one of Paragraphs A-F, wherein combining the bio-oil and the two-phase diluent comprises directing the bio-oil through a quill within a pipe, wherein the pipe provides the two-phase diluent.

H. The method of any one of Paragraphs A-G, wherein the bio-oil comprises poultry fats, poultry oil, vegetable fats, rendered fats, rendered oils, restaurant grease, brown grease, yellow grease, used cooking oil, waste industrial frying oils, fish oils, fish fats, algal oils, microbial oils, or a combination of any two or more thereof.

I. The method of any one of Paragraphs A-H, wherein the method produces a renewable diesel, wherein the renewable diesel has a carbon intensity of 30 $gCO_2e$/MJ or less according to California Air Resource Board CA-GREET3.0 model.

J. The method of any one of Paragraphs A-I, wherein fouling of the HDO reactor as evidenced by a pressure drop increase of no more than 10 psi during the service life of the catalyst.

K. The method of any one of Paragraphs A-J, wherein combining the two-phase diluent and the bio-oil provides a diluted bio-oil, and wherein the process further comprises contacting the diluted bio-oil with the catalyst bed to provide a catalyst bed outlet product.

L. The method of any one of Paragraphs A-K, wherein prior to combining the two-phase diluent and the bio-oil, the method comprises adjusting the bio-oil temperature to be from 50° F. less than to 100° F. more than the water dew point.

M. The method of any one of Paragraphs A-L, wherein prior to combining the two-phase diluent and the bio-oil, the process comprises measuring the two-phase diluent to determine the water dew point.

N. A method for hydrodeoxygenation of bio-oils over a catalyst bed comprising the steps
(a) providing a bio-oil;
(b) providing a two-phase diluent wherein the two phases include a liquid comprising a hydrocarbon and a vapor phase comprising hydrogen and water; and
(c) combining the bio-oil with the two-phase diluent wherein
the two-phase diluent is characterized by a water dew point and
the bio-oil temperature is at most 50 F below the water dew point of the two-phase diluent.

O. The method of Paragraph N wherein the bio-oil temperature is at most 20 F below the water dew point of the two-phase diluent.

P. The method of Paragraph N or Paragraph O wherein the bio-oil temperature is at most 10 F below the water dew point of the two-phase diluent.

Q. The method of Paragraph N wherein the bio-oil temperature is above the water dew point of the two-phase diluent.

R. The method of any one of Paragraphs N-Q wherein the bio-oil and the two-phase diluent are combined in a mix-tee.

S. The method of any one of Paragraphs N-R wherein the bio-oil and the two-phase diluent are combined through a static-mixer.

T. The method of any one of Paragraphs N-S wherein the bio-oil and the two-phase diluent are combined by providing the bio-oil through a quill within a pipe providing the two-phase diluent.

U. The method of any one of Paragraphs N-T wherein the bio-oil comprises poultry fats, poultry oil, vegetable fats, rendered fats, rendered oils, restaurant grease, brown grease, yellow grease, used cooking oil, waste industrial frying oils, fish oils, fish fats, algal oils, microbial oils and combinations thereof.

V. The method of any one of Paragraphs N-U wherein the method produces a renewable diesel, wherein the renewable diesel has a carbon intensity of 30 $gCO_2e$/MJ or less according to California Air Resource Board CA-GREET3.0 model.

W. The method of any one of Paragraphs N-V wherein hydrodeoxygenation of the bio-oil over the catalyst bed occurs in a hydrodeoxygenation reactor ("HDO reactor"), wherein fouling of the HDO reactor as evidenced by a pressure drop increase of no more than 10 psi during the service life of the catalyst.

Other embodiments are set forth in the following claims, along with the full scope of equivalents to which such claims are entitled.

What is claimed is:

1. A method for hydrodeoxygenation of a bio-oil over a catalyst bed in a hydrodeoxygenation reactor ("HDO reactor"), the method comprising combining a two-phase diluent having a water dew point of about 210° F. to about 350° F. and the bio-oil at a bio-oil temperature that is from 50° F. less than to 100° F. more than the water dew point, wherein the combining provides a diluted-bio-oil; and contacting the diluted bio-oil with the catalyst bed under hydrodeoxygenation conditions to provide a catalyst bed outlet product;

wherein the two-phase diluent comprises a liquid phase and a vapor phase, the liquid phase comprising a hydrocarbon and the vapor phase comprising hydrogen and water.

2. The method of claim 1, wherein the bio-oil temperature is from 20° F. to 0° F. less than the water dew point.

3. The method of claim 1, wherein the bio-oil temperature is from 10° F. to 0° F. less than the water dew point.

4. The method of claim 1, wherein the bio-oil temperature from 0° F. to 20° F. more than the water dew point of the two-phase diluent.

5. The method of claim 1, the method comprising combining the bio-oil and the two-phase diluent in a mix-tee.

6. The method of claim 1, the method comprising combining the bio-oil and the two-phase diluent through a static-mixer.

7. The method of claim 1, wherein combining the bio-oil and the two-phase diluent comprises directing the bio-oil through a quill within a pipe, wherein the pipe provides the two-phase diluent.

8. The method of claim 1, wherein the bio-oil comprises poultry fats, poultry oil, vegetable fats, rendered fats, rendered oils, restaurant grease, brown grease, yellow grease, used cooking oil, waste industrial frying oils, fish oils, fish fats, algal oils, microbial oils, or a combination of any two or more thereof.

9. The method of claim 1, wherein the method produces a renewable diesel, wherein the renewable diesel has a carbon intensity of 30 $gCO_2e$/MJ or less according to California Air Resource Board CA-GREET3.0 model.

10. The method of claim 1, wherein the HDO reactor has a pressure drop increase of no more than 10 psi during a service life of the catalyst bed.

11. The method of claim 1, wherein prior to combining the two-phase diluent and the bio-oil, the method comprises adjusting the bio-oil temperature to be from 50° F. less than to 100° F. more than the water dew point.

12. The method of claim 1, wherein prior to combining the two-phase diluent and the bio-oil, the process comprises measuring the two-phase diluent to determine the water dew point.

13. A method for hydrodeoxygenation of bio-oils over a catalyst bed comprising the steps
(a) providing a bio-oil;
(b) providing a two-phase diluent wherein the two phases include a liquid comprising a hydrocarbon and a vapor phase comprising hydrogen and water;
(c) combining the bio-oil with the two-phase diluent at a bio-oil temperature to provide a diluted bio-oil; and
(d) hydrodeoxygenating the diluted bio-oil over the catalyst bed;
wherein
the two-phase diluent is characterized by a water dew point of about 210° F. to about 350° F.; and
the bio-oil temperature is at most 50° F. below the water dew point of the two-phase diluent.

14. The method of claim 13, wherein the bio-oil temperature is at most 20° F. below the water dew point of the two-phase diluent.

15. The method of claim 13, wherein the bio-oil temperature is at most 10° F. below the water dew point of the two-phase diluent.

16. The method of claim 13, wherein the bio-oil temperature is above the water dew point of the two-phase diluent.

17. The method of claim 13, wherein the bio-oil comprises poultry fats, poultry oil, vegetable fats, rendered fats, rendered oils, restaurant grease, brown grease, yellow grease, used cooking oil, waste industrial frying oils, fish oils, fish fats, algal oils, microbial oils, a combination of any two or more thereof.

18. The method of claim 13, wherein the method produces a renewable diesel, wherein the renewable diesel has a carbon intensity of 30 $gCO_2e/MJ$ or less according to California Air Resource Board CA-GREET3.0 model.

19. The method of claim 13, wherein hydrodeoxygenation of the bio-oil over the catalyst bed occurs in a hydrodeoxygenation reactor ("HDO reactor"), wherein the HDO reactor has a pressure drop increase of no more than 10 psi during a service life of the catalyst bed.

* * * * *